Patented June 11, 1935

2,004,135

UNITED STATES PATENT OFFICE 2,004,135

PRODUCTION OF POLYHYDRIC ALCOHOLS

Henry S. Rothrock, Wilmington, Del., assignor to E. I. du Pont de Nemours & Company, Wilmington, Del., a corporation of Delaware No Drawing. Application December 23, 1932, Serial No. 648,588

12 Claims. (Cl. 260—156.5)

This invention relates to processes for producing lower polyhydric alcohols from higher polyhydric alcohols, and more particularly it refers to processes for producing glycerol, ethylene glycol and propylene glycol by hydrogenation of polyhydric alcohols containing a larger number of hydroxyl groups.

One object of this invention relates to an improved process for producing valuable lower polyhydric alcohols from polyhydric alcohols having a greater number of hydroxyl groups. It is a further object of the invention to provide a method of converting carbohydrates to lower polyhydric alcohols. Another object comprises the hydrogenation of polyhydric alcohols to produce polyhydric alcohols having a less number of hydroxyl groups, by carrying on the hydrogenation in the presence of a hydrogenation catalyst containing a weakly basic compound. Another object comprises the hydrogenation as carried out in the presence of a preferred nickel catalyst. A still further object relates to a process for purifying glycerol produced by hydrogenation of sugar alcohols and the like. Other objects of the invention will appear from the following description of the invention.

These objects are accomplished by the following invention, which involves heating polyhydric alcohols such as the sugar alcohols (sorbitol, mannitol, xylitol, etc.) with hydrogen at an elevated temperature and under a raised pressure in the presence of a suitable hydrogenating catalyst and in the presence of a weakly alkaline buffer, preferably calcium carbonate. These objects are further accomplished by carrying out the hydrogenation as described, under a preferred range of pressures and by the use of preferred catalysts comprising highly reduced nickel catalyst, i. e., catalysts containing at least 70% of the total nickel as metallic nickel. These objects are further accomplished by carrying out the reaction as a two-stage process, involving first, reducing monosaccharides to sugar alcohols and separation of the sugar alcohols from the catalyst; and second, reducing the sugar alcohols with fresh catalyst to produce lower alcohols.

It has been proposed previously to hydrogenate a variety of materials, such as sorbitol, dextrose, starch and pentoses, to yield lower polyhydric alcohols, by operating without the use of an alkaline buffer. I have conducted experiments and have found that by this method the yields of polyhydric alcohols are comparatively low, the glycerol produced is of low purity, and the acidity developed during the reaction rapidly attacks the catalyst, greatly impairing its activity and life. I have discovered that by employing a weakly alkaline buffer, preferably calcium carbonate, the yields of polyhydric alcohols, the purity of the glycerol, and the activity and life of the catalyst are markedly improved.

The following examples of this invention are included for purposes of illustration, but it should be understood that these examples are not to be regarded as limitations.

Example 1

This example will illustrate the use of calcium carbonate as a buffer.

A mixture of 150 grams of glucose and 75 grams of water was shaken in a suitable pressure tube with 15 grams of a nickel catalyst and 10 grams of powdered calcium carbonate in the presence of hydrogen under 1800 pounds pressure at a temperature of 150° C. After 25 minutes the absorption of hydrogen ceased, indicating the conversion of the glucose to sorbitol. The temperature was then raised to 250° C. and the pressure was maintained between 2200 and 1000 pounds pressure. After 60 minutes at this temperature the tube was cooled and the contents were filtered from the catalyst. After distillation of the water from the reaction products at atmospheric pressure, there was obtained by fractional vacuum distillation of the residue 24 grams of glycerol and 35 grams of a mixture of ethylene and propylene glycols. These yields correspond to 16% of glycerol and 23.3% glycols, or a total of 39.3%, based on the sugar used. The glycerol fraction was converted to a nitrate containing 17.82% nitrogen, as compared with 18.5% nitrogen in pure nitroglycerol.

A similar experiment carried out exactly as described above, but in which the calcium carbonate was omitted, gave in 60 minutes at 250° C. a product from which 22 grams (14.7%) of glycerol and 15 grams (10%) of glycols was obtained. The nitrate of the glycerol fraction contained only 17.01% nitrogen.

Other monosaccharides such as fructose, xylose, mannose, arabinose, rhamnose, etc., may be used in place of glucose.

Example 2

This example illustrates the higher purity of glycerin obtained by increasing the pressure when using calcium carbonate.

To a mixture comprising 150 grams of glucose in 75 grams of water was added 15 grams of a nickel catalyst and 15 grams of powdered calcium carbonate, and the hydrogenation was carried out as described in Example 1, except that a pressure of 3400–4200 pounds per square inch was maintained in the second stage (at 250° C.). After 50 minutes the reaction tube was cooled, and there was obtained from the products of the reaction 42 grams (28%) of glycerol and 25 grams (16.7%) of a mixture of ethylene and propylene glycols. The nitrate of the glycerol fraction was found to contain 18.22% nitrogen, as compared with 18.5% nitrogen for pure nitroglycerol.

As described in Example 1, the reaction carried out under similar conditions, except that a pressure of 1000–2200 pounds was employed at 250° C., gave 24 grams (16%) of glycerol and 35 grams (23.3%) of glycols. The glycerol produced in this experiment gave a nitrate containing only 17.82% nitrogen.

Example 3

This example demonstrates that the use of calcium carbonate at higher pressures results in an increased yield of polyhydric alcohols.

A mixture of 150 grams of glucose dissolved in 75 grams of water was shaken in a suitable pressure tube with 15 grams of a nickel catalyst and 15 grams of powdered calcium carbonate in the presence of hydrogen under 2400 pounds pressure at a temperature of 150° C. After seven minutes hydrogen was no longer absorbed, indicating practically complete reduction of the glucose to sorbitol. The temperature was then raised to 250° C. and the pressure was maintained at 3300–4400 pounds. After 75 minutes at this temperature the tube was cooled and the contents filtered from the catalyst and calcium carbonate. After distillation of the water from the reaction products at atmospheric pressure, there was obtained by fractional vacuum distillation of the residue 42 grams (28%) of glycerin and 56 grams (37.3%) of a mixture of ethylene glycol and propylene glycol.

A similar experiment carried out as described in Example 3, but in which calcium carbonate was omitted, and heated for 75 minutes at 250° C., gave only 29 grams (19.3%) of glycerin and 33 grams (22%) of a mixture of ethylene glycol and propylene glycol.

Example 4

This example describes the reduction of sorbitol (instead of glucose) in the presence of calcium carbonate and under my preferred pressure range.

A solution comprising 150 grams of sorbitol in 125 grams of water was shaken in a suitable pressure tube with 7.5 grams of a nickel catalyst and 7.5 grams of powdered calcium carbonate in the presence of hydrogen. The temperature was maintained at 250° C. and the pressure at 3400–4500 pounds for 75 minutes. After distillation of the water from the reaction products at atmospheric pressure, there was obtained by fractional vacuum distillation of the residue 53 grams of glycerin and 42 grams of a mixture of ethylene glycol and propylene glycol.

Example 5

This example illustrates the advantage of a two-step process, involving first reduction of monosaccharides to sugar alcohols, separation from the catalyst, and then reduction of the sugar alcohols to lower polyhydric alcohols with fresh catalyst.

The first stage of the process, the reduction of monosaccharides to sugar alcohols, can be effected with considerable catalyst savings. Thus sorbitol (or its equivalent) may be prepared from invert raw cane sugar by using 3% of catalyst to reduce four successive batches of sugar, involving a catalyst consumption of 0.75% of the sugar reduced.

The second stage may be effected as described in Example 4, as follows: A solution comprising 150 grams of sorbitol in 105 grams of water was shaken in a pressure tube with 4.5 grams (3% of the weight of sorbitol) of nickel catalyst and 4.5 grams of powdered calcium carbonate in the presence of hydrogen at a maintained pressure of 3300–4300 pounds. The temperature was held at 250° C. for 45 minutes. On discharging the contents of the tube and treating the products as described in Example 1, there was obtained 37 grams (24.7%) of glycerol and 53 grams (35.3%) of a mixture of ethylene and propylene glycols. When 5% of catalyst was used instead of 3%, it was found that the same catalyst could be used to effect the reduction of five successive sorbitol solutions (prepared as described above) before becoming spent, an average yield of 37.2 grams (24.8%) of glycerin and 50.4 grams (33.6%) of glycols being obtained in an average reaction time of 53 minutes, involving a catalyst consumption of 1% of the weight of sorbitol treated.

By operating as described in the two preceding paragraphs, monosaccharides are reduced to sugar alcohols with catalyst consumption of 0.75% of the weight of sugar reduced, while the sugar alcohols may be reduced to lower polyhydric alcohols with a catalyst consumption of 1%, involving then for the complete reduction of monosaccharides to lower polyhydric alcohols a total catalyst consumption of 1.75%.

The transfer of catalyst from one run to the next should be preferably carried out in an inert atmosphere.

When an equivalent quantity of a glucose solution was reduced with 4.5 grams (3%) of catalyst and 4.5 grams of calcium carbonate, operating first at 150° C. and at 2000 pounds hydrogen pressure, to produce sorbitol, and then heating directly to 250° C. without separation from the catalyst and reducing for one hour at 3000–4500 pounds, a yield of 22 grams (14.7%) of glycerin and 42 grams (28%) of glycols was obtained. Furthermore, it was found that even when operating in this manner with 5% of catalyst, the catalyst became exhausted after one reduction and could not be used to reduce further amounts of glucose.

Where a two-step process is used, as described in the above example, the temperature is maintained between 100°–175° C. and the pressure is maintained above 1000 pounds per square inch during the hydrogenation of the monosaccharide to the hexite.

Example 6

This example illustrates the use of starch as a raw material for this process.

A solution of 25.6 grams of concentrated sulfuric acid in 500 grams of water was brought to boiling and a cold paste of 300 grams of starch (containing 11.37% moisture) in 380 grams water was added slowly with vigorous stirring, the mixture being kept at the boiling point during the addition. The solution was refluxed gently for three hours and twenty minutes, at which point it was neutralized with calcium carbonate and filtered. An analysis showed that 92% of the starch was converted to glucose. The filtered solution was evaporated to a small volume and 275 grams of the concentrate corresponding to 150 grams of the starch was reduced as described in Example 2, using 15 grams of nickel catalyst and five grams of calcium carbonate, and employing a pressure of 3400–4400 pounds at 250° C. After a 55 minute hydrogenation at this temperature, there was obtained from the products of the reaction 40 grams (26.7%) of glycerol and 42 grams (28%) of a mixture of ethylene and propylene glycols.

The step of hydrolyzing starch, as described in the preceding example is necessary to produce satisfactory yields of lower polyhydric alcohols. Unhydrolyzed starch gives very poor conversion upon treatment with hydrogen in the presence of a catalyst.

*Example 7*

This example shows the advantage of employing catalysts containing a high proportion of their nickel as reduced metallic nickel from the standpoint of obtaining a high ratio of glycerol to glycols.

A mixture of 150 grams of glucose and 75 grams of water was treated with 15 grams of calcium carbonate and 15 grams of a reduced nickel catalyst which had 95% of its total nickel as metallic nickel and was hydrogenated as described in Example 2. After a 35 minutes' reduction at 250° C., there was obtained 43 grams (28.7%) of glycerol and 43 grams (28.7%) of a mixture of ethylene and propylene glycols.

On repeating the above experiment using a reduced nickel catalyst containing only 68% of its nickel as metallic nickel, equivalent hydrogen absorption required 75 minutes at 250° C. and there was obtained 33 grams (22%) of glycerol and 55 grams (36.7%) of glycols.

*Example 8*

This example shows that the amount of calcium carbonate may be varied within wide limits without affecting the reaction.

A solution of 150 grams of sorbitol in 125 grams of water was reduced as described in Example 4 in the presence of 7.5 grams of a nickel catalyst and 7.5 grams (5%) of powdered calcium carbonate. After hydrogenating at 250° C. and under 3400–4400 pounds hydrogen pressure for 45 minutes, there was recovered 47 grams (31.3%) of glycerol and 37 grams (24.7%) of a mixture of ethylene and propylene glycols.

On carrying out the reduction as described above but using only 1.5 grams (1%) of calcium carbonate, there was obtained after a 60 minute hydrogenation 52 grams (34.7%) of glycerol and 41 grams (27.3%) of ethylene and propylene glycols.

While calcium carbonate is the most satisfactory buffer for maintaining a weakly alkaline medium during the hydrogenation, it is to be understood the other alkaline materials may also be used. For example, other alkaline earth carbonates, borax, aluminum hydroxide, very small amounts of sodium carbonate, and other weakly basic materials which are not catalyst poisons may be used.

Although the use of large amounts of calcium carbonate (1–10% of the weight of sugar alcohol) is described in the examples, it is not necessary to use more than just sufficient calcium carbonate to maintain a weakly alkaline reaction mixture during the course of the hydrogenation. The use of large amounts (i. e., above 5%) is not harmful but no additional advantage is gained by so operating.

The hydrogenation of sugar alcohols to glycerol and other polyhydric alcohols does not occur to an appreciable extent below 200° C. The operative temperature range for the reaction may be given as 200°–300° C., but the optimum temperatures are in the neighborhood of 250° C. The reaction may be accomplished at pressures as low as 1000 pounds per square inch, although at 250° C. the reaction is very slow below 1500 pounds per square inch. The upper limit of pressure is determined only by the strength of the apparatus used. However, pressures of at least 3000 pounds are preferable, and the preferred pressure range may be stated as 3000–4000 pounds per square inch. There is no important advantage to be gained by operating at pressures above 4000 pounds.

As raw materials for the process, sugar alcohols prepared from monosaccharides may be used. In the examples cited sorbitol is used, but mannitol, dulcitol, xylitol, etc. may also be used. Polysaccharides should preferably be hydrolyzed to monosaccharides prior to reduction to sugar alcohols. Thus, though cane sugar does not itself hydrogenate smoothly to sugar alcohols, by first inverting a solution of cane sugar with traces of acids, neutralizing the acid, and hydrogenating the material at temperatures between 135° C. and 170° C. a solution of sugar alcohols satisfactory for further hydrogenation to lower polyhydric alcohols may be obtained. Raw cane sugar, maltose, lactose, etc. may also be treated in the same way. Starch does not reduce satisfactorily, but on subjecting a starch suspension to an acid hydrolysis by any of several known methods, a glucose solution is obtained which, after neutralization, may be readily converted to sorbitol for use in this process as described in Example 6. Cellulose and other polysaccharides may be similarly treated.

As catalysts may be used hydrogenating catalysts, preferably reduced nickel or cobalt. However, it has been found that highly reduced nickel catalysts (i. e., catalysts containing a high proportion of their total nickel as elementary nickel) allow a shorter reaction time, produce a higher ratio of glycerol to glycols and of ethylene glycol to propylene glycol, and give glycerol of higher purity than may be obtained with catalysts of lower free nickel content. For the best results the nickel in the catalyst should be reduced to at least 70–80%, or higher. The nickel catalysts used in all of the examples with the exception of Example 7, comprised nickel supported on an inert carrier, the nickel being approximately 70% in the metallic form. Example 7 illustrates the advantage of highly reduced catalysts. Other hydrogenating catalysts which may be used in place of metallic nickel or cobalt, are nickel chromite, e. g., as prepared by the ignition of nickel chromate at 600° C. or above, alumina containing metallic nickel, and copper-zinc compositions. The preferred catalysts, however, are the nickel catalysts.

While an aqueous solution of sugar alcohols is specifically described in the examples and is generally preferable, this invention is not limited to aqueous solutions. Thus, solutions or suspensions in alcohol, propylene glycol, decalin, or other solvents may be used. It is also possible to reduce sugar alcohols according to this process in the absence of any solvent or dispersing medium.

When reducing sugar alcohols in aqueous solution according to this process, it is found that glycerol of higher purity is obtained when relatively dilute solutions (such as 25%) are used than when more concentrated solutions of 50–75% are employed.

The hydrogenation of higher polyhydric alcohols to lower polyhydric alcohols as described in my process may be carried out in any apparatus which insures satisfactory contact between the substrate, catalyst, and hydrogen. The examples cited describe batch processes, but it is possible to carry out the reaction as a continuous process by forcing the material to be treated over a suitable catalyst in contact with hydrogen gas.

While the examples as described do not indicate more than the separation of a mixture of ethylene and propylene glycols from the products of the reaction, it is also possible to subject this glycol mixture to further fractional distillation, by which process the two glycols may be partially or nearly wholly separated.

While the production of lower polyhydric alcohols by the hydrogenation of higher polyhydric alcohols is known, this process of reducing in a weakly alkaline solution has many advantages. The use of calcium carbonate under the preferred conditions stated greatly increases the yield of glycerin and glycols obtained by the processes, improves the life of the catalyst by preventing dissolution of large amounts of metallic catalyst by acidity formed in the reaction, and produces glycerol of a higher purity.

Glycerol formed by the hydrogenation of sugar alcohols and the like, even in the presence of an alkaline buffer and even after the most careful fractionation of the hydrogenation reaction products, is contaminated with small amounts of impurities which impart an undesirable odor and taste to the glycerol. The contaminated product due to the presence of the impurities is unsatisfactory for some very exacting uses, e. g., the production of nitroglycerin. Ordinary methods of purification, such as distillation, treatment with activated carbon, etc., do not effect a satisfactory purification due to the similarity of glycerol and the impurities in chemical and physical properties. Thus, the most troublesome impurities are believed to be largely polyalcohols containing a higher ratio of carbon to oxygen than glycerol, e. g., methyl glycerol.

The following examples illustrate methods for hydrogenating, with and without an alkaline buffer, polyhydric alcohols such as the sugars and sugar alcohols to produce glycerol and other polyhydric alcohols having a less number of hydroxyl groups than the material hydrogenated:

Example A

A solution comprising 150 grams of 90% sorbitol dissolved in 100 grams of water was shaken for a period of 1¾ hours in a suitable reaction tube with 15 grams of a nickel-chromium oxide catalyst made by the partial reduction of nickel chromate and in the presence of hydrogen. The temperature was maintained between 250°–275° C. and the hydrogen pressure at 3000 pounds. There was recovered from the tube 255 grams of reaction products. The catalytic material was filtered from the mixture in the reaction tube and the filtrate was fractionally distilled. There was obtained approximately 170 grams of material which came over at 100°–102 C., 50 grams of which came over at 187°–190° C. and was identified as 1:2 propylene glycol. There was a non-volatile residue amounting to approximately 34 grams which was probably unchanged sorbitol containing some glycerol.

Example B

A mixture of 150 grams of glucose and 75 grams of water was shaken in a suitable pressure tube with 15 grams of a nickel catalyst in the presence of hydrogen under 1800 pounds pressure at a temperature of 150° C. After 25 minutes the absorption of hydrogen ceased, indicating the conversion of the glucose to sorbitol. The temperature was then raised to 250° C. and the pressure was maintained between 2200 and 1000 pounds pressure. After 60 minutes at this temperature the tube was cooled and the contents were filtered from the catalyst. After distillation of the water from the reaction products at atmospheric pressure, there was obtained by fractional vacuum distillation of the residue 22 grams of glycerol and 15 grams of a mixture of ethylene and propylene glycols. These yields correspond to 14.7% of glycerol and 10% of glycols.

The reaction conditions, and the materials hydrogenated may be varied greatly from those described in the above examples, but the glycerol obtained as a product of the reaction after careful separation by distillation invariably contains impurities undesirable for certain rigorous requirements. In accordance with the present invention, it has been found the glycerol produced by the hydrogenation of sugars, sugar alcohols and the like, can be obtained in a highly pure form by subjecting the impure glycerol to extraction with suitable solvents. The following example illustrates one form of extraction process which may be used:

Example C

A sample of glycerol, prepared by the hydrogenation of sorbitol according to the process as described in Example 4, when nitrated and allowed to stand in contact with the nitrating acid, according to a standard test, was observed to fume after 5.5 minutes, indicating the glycerol to be unsatisfactory for the production of nitroglycerol. A 22 gram sample of this glycerol was subjected to a continuous extraction in a suitable apparatus with chloroform for 21 hours. About 13% of the total product was removed by this treatment. The glycerol so treated and vacuum distilled to remove the last traces of solvent fumed off after 11.9 minutes when subjected to the above test, indicating a much higher quality of glycerol. The treated product was odorless and colorless and appeared to be more suitable for many purposes than the original glycerol.

As solvents for the extraction of glycerol may be used any liquids inert to glycerol and in which glycerol is not soluble to any large extent. More particularly, liquids or mixtures which dissolve hydrocarbon-type materials more readily than water-type materials are to be preferred as solvents. It is advisable to use a low-boiling solvent in order to facilitate the removal of the last traces of solvent from the purified glycerol. Thus chloroform, ether, carbon tetrachloride, etc. may be used satisfactorily as solvents. The glycerol may be used either concentrated or in solution in water. Though it is possible to conduct the extraction as a batch process, by agitating the glycerol or solution of glycerol with the solvent, it is better to operate using a continuous process, using any known satisfactory method and apparatus. The residual solvent in the extracted glycerol may be removed by aeration, heating under vacuum, or other suitable method.

Glycerol, purified by solvent extraction of hydrogenation glycerol, is colorless, odorless, and sweet-tasting, and may be applied to uses wherein a very highly purified glycerol is desired. The portion extracted by the solvent, comprising a concentrated solution of the impurities in glycerin, may be utilized for such products as antifreeze mixtures.

The uses of the products of this invention are widespread, being mainly uses to which glycerol, ethylene glycol, and propylene glycol can be put. Among the many uses to which these materials and their derivatives may be applied are for explosives, anti-freeze mixtures, solvents, softeners, and resins.

The above description and examples are intended to be illustrative only. Any modification of or variation therefrom which conforms to the spirit of the invention is intended to be included within the scope of the claims.

I claim:

1. In the process of producing lower polyhydric alcohols from a polyhydric alcohol having a greater number of hydroxyl groups comprising catalytically hydrogenating the latter alcohol at high pressures and at a temperature sufficiently high to effect splitting of the carbon-carbon bond, the step which comprises passing the said alcohol together with hydrogen in contact with a hydrogenation catalyst in the presence of a weakly alkaline compound.

2. The process of claim 1 in which the alkaline compound is calcium carbonate.

3. The process of claim 1 in which the alkaline compound is calcium carbonate, and in which the hydrogenation catalyst is nickel.

4. The process of claim 1 further modified in that the glycerol prepared is treated with a liquid which will dissolve hydrocarbons more readily than water.

5. The process of claim 1 further modified in that the glycerol produced is treated with a liquid taken from the class consisting of chloroform, ether and carbon tetrachloride.

6. The process of claim 1 further modified in that the glycerol is extracted with chloroform.

7. In the process of producing lower polyhydric alcohols from a polyhydric alcohol having a greater number of hydroxyl groups comprising catalytically hydrogenating the latter alcohol at high pressures and at a temperature sufficiently high to effect splitting of the carbon-carbon bond, the step which comprises passing the said alcohol together with hydrogen in contact with a nickel catalyst in the presence of a weakly alkaline compound.

8. In the process of producing lower polyhydric alcohols from a polyhydric alcohol having a greater number of hydroxyl groups comprising catalytically hydrogenating the latter alcohol at high temperatures and pressures, the step which comprises passing the said alcohol together with hydrogen in contact with a hydrogenation catalyst in the presence of a weakly alkaline compound at a temperature of 200°–300° C. and under superatmospheric pressure.

9. The process of claim 8 in which the pressure is maintained between 3000–4000 pounds per square inch.

10. In the process of producing lower polyhydric alcohols from a polyhydric alcohol having a greater number of hydroxyl groups comprising catalytically hydrogenating the latter alcohol at high temperatures and pressures, the steps which comprise hydrogenating a monosaccharide in the presence of a hydrogenation catalyst at a temperature of 100°–200° C. and under superatmospheric pressure, then separating the reaction mass from the catalyst and further reducing with hydrogen in the presence of fresh catalysts at a temperature of 200°–300° C. and under a pressure substantially above that used in the first reduction step.

11. The process described in claim 10 in which the hydrogenating catalyst of the second reduction step of the process is used in the presence of a weakly alkaline compound.

12. In the process of producing lower polyhydric alcohols from a polyhydric alcohol having a greater number of hydroxyl groups comprising catalytically hydrogenating the latter alcohol at high pressures and at a temperature sufficiently high to effect splitting of the carbon-carbon bond, the steps which comprise hydrolizing a polysaccharide to produce monosaccharide, then passing the product of the hydrolysis together with hydrogen in contact with a hydrogenation catalyst in the presence of a weakly alkaline compound.

HENRY S. ROTHROCK.